(No Model.)

M. E. OWEN.
COOKING RANGE OR STOVE.

No. 456,158. Patented July 21, 1891.

Witnesses:
Howard L. White
H. de Vos

Inventor:
Margaret Emma Owen
By
Attorneys.

UNITED STATES PATENT OFFICE.

MARGARET EMMA OWEN, OF LAMBOURN, ENGLAND.

COOKING RANGE OR STOVE.

SPECIFICATION forming part of Letters Patent No. 456,158, dated July 21, 1891.

Application filed September 30, 1889. Serial No. 325,531. (No model.) Patented in England August 16, 1888, No. 11,857.

*To all whom it may concern:*

Be it known that I, MARGARET EMMA OWEN, a subject of the Queen of Great Britain, residing at Lambourn, in the county of Berks, England, have invented new and useful Improvements in Cooking Ranges or Stoves, (for which I have obtained a patent in Great Britain, dated August 16, 1888, No. 11,857,) of which the following is a specification.

In open-fire ranges as they are usually constructed the oven-compartment is entirely cut off from the fire and is heated by hot products of combustion from the fire passing through flues surrounding it.

According to my invention the side of the oven next the fire is made of an open grating with strong bars sufficiently close together to prevent cinders or much ash from passing through them to the oven. The circular plate or grid inside the oven, on which the food rests while cooking, is carried by a spindle supported in a step-bearing under the oven, the plate or grid being made to revolve slowly by suitable clock-work mechanism. By this means it will be seen that the food is subjected to a roasting instead of a baking action.

The accompanying drawings show a cooking range or stove constructed according to my above-described invention.

Figure 1:
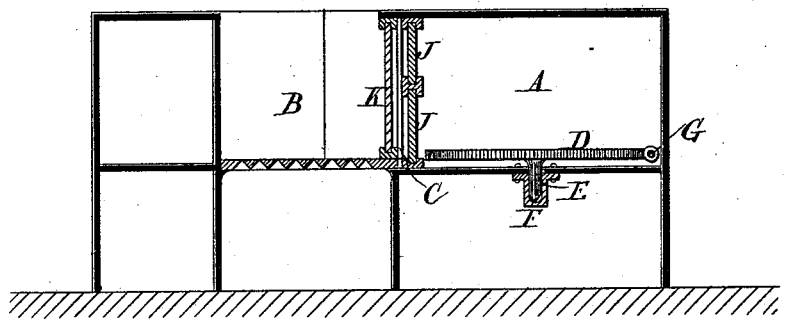
Figure 2:
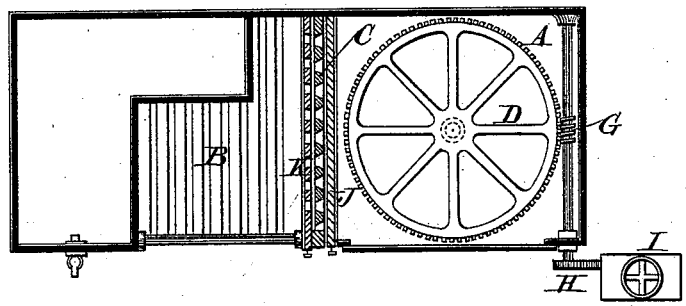

Figure 1 shows a sectional elevation, and Fig. 2 a sectional plan.

The oven A has its side next the fire-compartment B formed with bars C sufficiently close together to prevent the fuel from falling through. The plate D within the oven is circular, and is carried by a spindle E, passing through the bottom of the oven and supported on a block, by preference of glass or steel, in a step-bearing F. The circumference of the plate D is provided with teeth, with which gears a worm G on a spindle passing through the front of the oven at the side of the door and provided at its outer end with a toothed pinion H, which is driven by any suitable clock-work mechanism I, such as the common "vernvolver" used to turn the spit in Dutch ovens.

In order to regulate the heat thrown into the oven, as also to direct the same more into the upper or into the lower parts, I provide two or more horizontal sliding dampers J J, situated one above the other on the inner side of the bars C, so that on entirely drawing out both dampers the full heat of the fire is thrown into the oven. On closing both the direct communication is cut off and the oven can be made to act as an ordinary one, while on leaving the one or the other open the direct heat is restricted in a corresponding manner. In addition to or in lieu of the above dampers may be employed a sliding "hit-and-miss" valve, as indicated at K, by moving which in one direction or the other the spaces between the bars C are more or less closed or opened, thereby regulating the direct heat transmitted through them.

My above-described invention can be applied as well to close-fire ranges or kitcheners as to open-fire ranges, and existing ranges may have the invention adapted to them.

In addition to the above-mentioned great advantage of obtaining a roasting action in place of a baking action, my invention affords the further advantages of effecting a saving of fuel and time in cooking and of keeping the food constantly turned, so as to be uniformly acted upon without requiring the oven to be opened.

It will be evident that the arrangement of the bars C to the oven can be applied without that for rotating the plate D, and vice versa.

Having thus described the nature of this invention and the best means I know for carrying the same into practical effect, I claim—

In an oven, the combination, with a cooking-compartment A and a fire-compartment B, of the intervening bars C, adapted to sustain the fuel, the dampers J J, arranged one above the other, for cutting off the cooking-compartment entirely from the fire-compartment or for admitting the direct roasting-heat at different heights, and a rotary plate or shelf D, situated in the compartment A, whereby the oven may be used for baking or roasting, substantially as described.

In testimony whereof I have signed my name to this specification, in the presence of two subscribing witnesses, this 11th day of September, A. D. 1889.

MARGARET EMMA OWEN.

Witnesses:
 THOMAS GEORGE BOTTOM,
  *44 Saint Mary's Road, Oxford, Clerk to Thomas Marriott Davenport, Oxford, Notary Public.*
 RICHD. CLARIDGE,
  *14 Walton Street, Oxford, Clerk to the said Thomas Marriott Davenport.*